United States Patent

[11] 3,571,610

| | | | |
|---|---|---|---|
| [72] | Inventor | Rodney Hayden<br>Stoney Creek, Ontario, Canada | |
| [21] | Appl. No. | 840,689 | |
| [22] | Filed | July 10, 1969 | |
| [45] | Patented | Mar. 23, 1971 | |
| [73] | Assignee | United-Carr Incorporated<br>Boston, Mass. | |

[54] GENERAL PURPOSE FLASHER DEVICE FOR AUTOMOTIVE USE
2 Claims, 2 Drawing Figs.

[52] U.S. Cl. .................................................. 307/332, 340/83
[51] Int. Cl. .................................................. B60g 1/46, H01h 47/00

[50] Field of Search .................................................. 307/132 (MR); 340/73, 74, 81, 331, 332; 315/226

[56] References Cited
UNITED STATES PATENTS
| | | | |
|---|---|---|---|
| 2,895,082 | 7/1959 | Suyetani | 307/132MR |
| 3,247,402 | 4/1966 | Hayden | 307/132MR |

*Primary Examiner*—Lee T. Hix
*Attorneys*—Philip E. Parker, Gordon Needleman, James R. O'Connor, John Todd and Hall and Houghton ABSTRACT: This is an RC coil circuit which can be used as an alternator, a hazard-warning flasher, a turn signal flasher and a buzzer depending on the switch activated.

INVENTOR
RODNEY HAYDEN
BY
*Gordon Needleman*
ATTORNEY

GENERAL PURPOSE FLASHER DEVICE FOR AUTOMOTIVE USE

BACKGROUND OF THE INVENTION

There is a demand for a single device having no more than three terminals which can serve to provide a pulsing signal to signal lamps of an automobile for effecting turn signals, hazard warning signals and also for alternating warning signals. The requirement for an alternating signal is usually found in school buses and some classes of truck installation. In turn signal operation front and rear lights on one side of the automobile only will be actuated by pulses. In hazard warning operation all signal lights of the automobile may be actuated by pulses simultaneously. In alternating signalling as a further kind of warning signal, all signal lights at the front of the vehicle or at one side will be actuated by one pulse and the opposite signal lamps respectively actuated by the following pulse and so on.

There is a further demand for the circuit connections of automobile signalling to be simplified and brought to a common area of hookup. A further necessary function in many installations is the provision of a buzzer signal to indicate when the ignition key is left in the ignition switch though the switch may be turned off. Further, there is a demand for a buzzer signal if the door of the vehicle is open, as for example, in school bus installations and the like

SUMMARY OF THE INVENTION

It is an object of the invention to provide a flasher device for general purpose usage adapted to satisfy all of the foregoing requirements through four terminals only.

It is a further object of the invention to provide a flasher device which in its flasher function embodies three connecting terminals only.

It is a still further object of the invention to provide a dual output flasher device adapted for a variety of pulse applications for warning signals.

With the foregoing and other objects in view the invention generally concerns a flasher device having a voltage source terminal and two load terminals one of which connects to a normally open circuit of said relay. The voltage terminal connects to the relay armature to energize the relay winding through the normally closed circuit including a resistor and the normally open load. The relay arm then switches voltage to the normally open load and is held in such switch position by a condenser paralleled with the relay coil and in series with the resistor in a timing circuit function which when completed releases the relay arm to distribute voltage to the normally closed circuit. The invention contemplates a fourth terminal including a second winding on the relay useful in a buzzer warning function.

DESCRIPTION OF THE PREFERRED EMBODIMENTS

Figure 1:
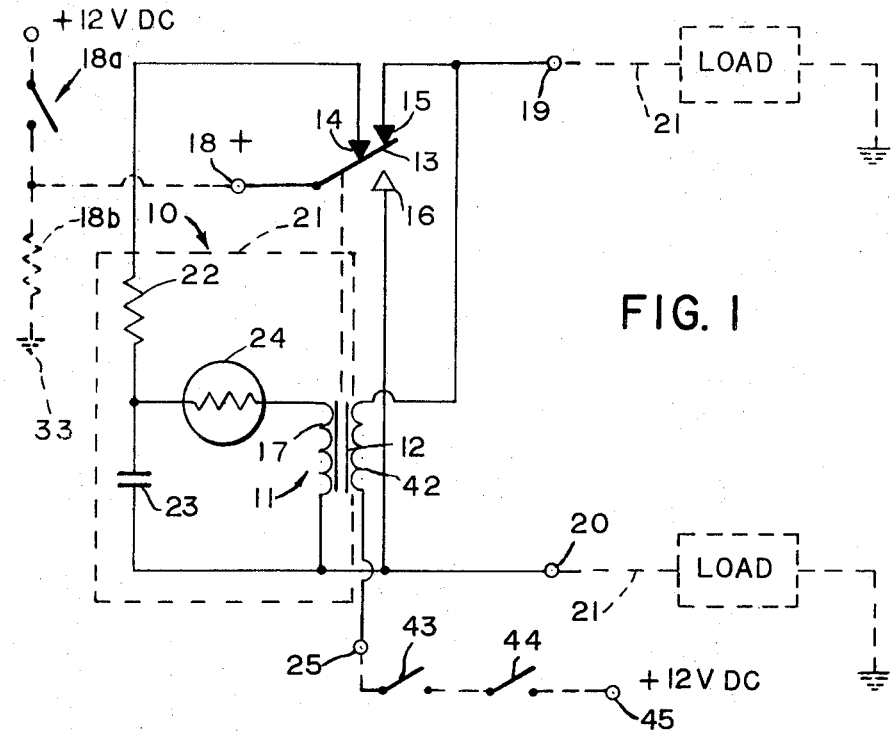
FIG. 1 is an electrical schematic of the device of the invention.

Referring to the drawings the general purpose flasher device 10 of the invention is adapted primarily for automotive use.

The device of the invention comprises the direct current relay 11 having a core 12 adapted to move armature 13 which armature is connected normally to two electrically separate normally closed contacts 14, 15. The armature 13 is adapted when drawn by relay core 12 to move to a position electrically engaging the normally open contact 16. The relay winding 17 when energized effects such armature motion.

A plus voltage terminal 18 electrically connects to armature 13 and is adapted to be connected in an automobile circuit to the ignition circuit 18a which circuit includes the direct current resistance communicating to chassis ground of so-called dead circuitry; i.e. circuitry which is responsive to closing of the ignition switch. For purposes of this specification the plus terminal 18 may be regarded as including a low order resistance to ground and to serve when the ignition circuit is open as an effective ground for the device of the invention.

In flasher use the device of the invention embodies three terminals to be connected to automobile circuitry. Terminal 18 already described communicates to the ignition circuit for plus voltage when the ignition is turned on. Terminal 19 may be designated at its normally closed load connection. Terminal 20 serves as a normally open load terminal connection. The normally closed load terminal 19 is connected to one of the normally closed relay contacts 15. The normally open relay contact 16 is connected to the normally open load terminal 20.

The flasher or timing circuit 21 shown in chain lines for the device of the invention comprises the resistor 22 and condenser 23 connected electrically in series between the normally open load terminal and the other of the normally closed relay contacts 14. A thermistor 24 utilized for temperature compensation is connected electrically in series with the relay winding 17 across the condenser 23.

Figure 2:
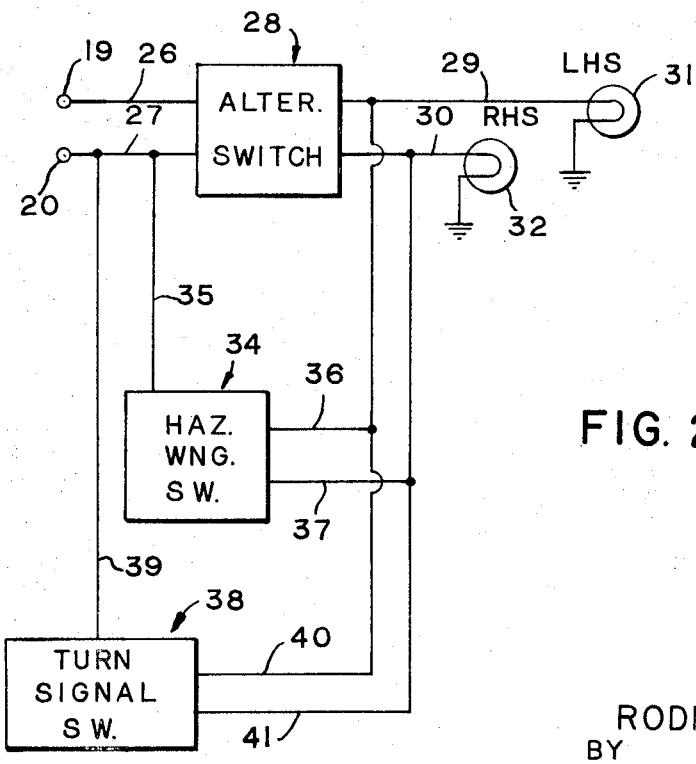
FIG. 2 is a block diagram electrical schematic of one way of utilizing the output of the device of FIG. 1 in turn signal indication hazard warning indication and alternating type of signal indication in automobile circuitry.

In flasher and alternator operation the device of the invention may be used in the manner indicated in FIG. 2 in which load terminals 19 and 20 communicate by lines 26 and 27 to an alternating switch 28, the latter being in the form of a conventional double pole single throw manual switch communicating in turn by lines 29 and 30 to signal lamps 31 and 32 to ground and located respectively on the left and right-hand sides of an automotive vehicle. Additionally, a hazard warning switch 34 may be of the double-pole single-throw type communicating by line 35 and lines 36 and 37 between the normally open load terminal 21 and lamps 31 and 32. Further, the turn signal switch 38 being of conventional turn signal automotive type may be connected by lines 39, 40 and 41 between normally open load terminal 20 and lamps 31 and 32.

As soon as any of the switches 28, 34 or 38 is closed the flasher circuit 21 is energized through contact 14 and resistor 22 through relay winding 17 to the lamp 32 causing relay armature 13 to move after RC delay 22, 23 to effect closure with contact 16 and to be held according to the time constants of the timing or flasher circuit defined by the values of the components 23, 11 therein. Preferably resistor 22 is 56 ohms, condenser 23 2,000 microfarads at 7-volt rating, thermistor 24 of 50 ohms and relay winding 17 of 130 ohms direct current resistance for a 12-volt ignition circuit. The values given will provide a flashing rate of the order of 90 pulses per minute.

The invention also provides for a fourth terminal, namely a buzzer terminal 25. The second winding 42 is provided for relay 11 and is connected between buzzer terminal 25 and normally closed load terminal 19. Buzzer terminal 25 is adapted to be connected to one or more warning signal switches in series such as the door switch 43 and the ignition key switch 44 connected in turn to a plus battery voltage 45. The key switch is of a conventional form which is closed when the key is in the ignition lock but the ignition is not turned on. The door switch will be closed when the automobile door is open. Thus in operation if the ignition key is off and the key in the ignition and the door is open, a buzzer signal reminds the operator that the ignition key is still in the lock. The buzzer signal derives from plus voltage energizing the second relay winding 42 through the normally closed contact and plus terminal 18 at effective ground to chassis through dead circuit resistance 18b communicating to chassis ground 33. If however, the ignition circuit is on, the key switch 44 will be open and the second relay coil 42 will not be energized. The reminder buzzer terminal is therefore only useful when the ignition is off, and is capable of operating because the resistance of the relay winding is substantially greater than the dead circuit resistance, or latent resistance, of the automobile ignition circuitry.

The flasher device of the invention may be regarded as of the three terminal type and embodying a buzzer function by way of the fourth terminal enabling same to be adapted to multiple and combined use in automobile circuitry. While terminal 45 is shown as having plus voltage thereon by way of example in FIG. 1 it will be understood that such terminal may be at chassis ground in some applications, the use of two normally closed relay contacts according to the invention enables the value of condenser 23 to be reduced to one half that which would be required if contacts 14, 15 were replaced by a single relay contact.

I claim:

1. A general purpose flasher device for automotive use and comprising: a relay having an armature connectable to two separate normally closed contacts and one normally open contact and a relay winding which when energized moves said armature to open said normally closed contacts and to close said normally open contact; a plus voltage terminal electrically connected to said armature; a normally closed load terminal connected to one of said normally closed relay contacts; a normally open load terminal connected to said normally open relay contact; a resistor and a condenser in series between said normally open terminal and the other of said normally closed relay contacts; and a thermistor in series with said ray winding across said condenser.

2. The device of claim 1 and a second winding for said relay; a buzzer terminal; and means connecting said second winding between said buzzer terminal and said normally closed output terminal.